United States Patent

Haitko et al.

[11] Patent Number: 5,362,402
[45] Date of Patent: Nov. 8, 1994

[54] ENHANCED REMEDIATION OF AQUEOUS COMPOSITIONS CONTAMINATED WITH HALOGENATED HYDROCARBONS

[75] Inventors: Deborah A. Haitko, Schenectady; Sunita S. Baghel, Rensselaer; Patricia D. Mackenzie, Clifton Park, all of N.Y.

[73] Assignee: General Electric Company, Schenectady, N.Y.

[21] Appl. No.: 217,832

[22] Filed: Mar. 25, 1994

[51] Int. Cl.$^5$ ................................ C02F 1/70
[52] U.S. Cl. ...................... 210/757; 210/908; 210/909; 588/206
[58] Field of Search ........... 210/757, 758, 908, 909; 588/206, 207

[56] References Cited

U.S. PATENT DOCUMENTS

| | | | |
|---|---|---|---|
| 4,382,865 | 5/1983 | Sweeny | 210/743 |
| 4,416,767 | 11/1983 | Jordan | 208/262 |
| 4,758,346 | 7/1988 | Johnson | 210/638 |
| 5,051,030 | 9/1991 | Saha et al. | 405/128 |
| 5,093,011 | 3/1992 | Friedman et al. | 210/757 |
| 5,096,600 | 3/1992 | Hoch | 210/751 |
| 5,273,657 | 12/1993 | Nakashima et al. | 210/640 |

FOREIGN PATENT DOCUMENTS

| | | |
|---|---|---|
| 0454642A1 | 10/1991 | European Pat. Off. . |
| 3912820C2 | 10/1990 | Germany . |
| 53-55475 | 5/1978 | Japan . |
| 2238533A | 6/1991 | United Kingdom . |
| WO92/07797 | 5/1992 | WIPO . |

*Primary Examiner*—Neil McCarthy
*Attorney, Agent, or Firm*—James Magee, Jr.

[57] ABSTRACT

A process for significantly improving the rate of dehalogenation of aqueous compositions contaminated with halogenated hydrocarbon compounds is disclosed. The process involves admixing the contaminated aqueous composition with metallic iron in the presence of citric acid both in-situ and ex-situ. The use of citric acid as an additive in the reaction substantially increases the rate of iron-induced dechlorination of chlorinated hydrocarbons, such as trichloroethylene.

10 Claims, No Drawings

ENHANCED REMEDIATION OF AQUEOUS COMPOSITIONS CONTAMINATED WITH HALOGENATED HYDROCARBONS

FIELD OF THE INVENTION

The present invention relates to a method for the dehalogenation of halogenated hydrocarbons in an aqueous composition. More specifically, it relates to dechlorination of hydrocarbons by metallic iron in the presence of citric acid.

BACKGROUND OF THE INVENTION

Polychlorinated hydrocarbons, such as carbon tetrachloride, chloroform, trichloroethylene, and tetrachloroethylene have been widely used as chemical intermediates, solvents for dry cleaning of clothing, degreasing, and a variety of other applications. Halogenated hydrocarbons are very stable and persistent in the environment. They are relatively toxic at low levels.

Over the years, halogenated hydrocarbons have been accumulating in the environment, particularly in groundwaters. As a result, pollution of water by chlorinated hydrocarbons has become an important environmental problem and contaminated groundwaters represent a large portion of environmental remedial action plans throughout the world.

It is known that chlorinated compounds can be degraded by reductive dechlorination, that is, replacement of chlorine substituents by hydrogen. Evidence indicates that many of the chlorinated solvents are degraded under anaerobic conditions in sediments and in systems simulating anaerobic wastewater treatment. Current theories suggest that some of these anaerobic dechlorinations are not strictly biological in nature, but are catalyzed by metallic iron.

In the patent literature, patents are issued that use metals or metallic couples to degrade chlorinated organic compounds. In U.S. Pat. No. 3,640,821 to K. H. Sweeney and J. R. Fischer, metallic zinc is used for removing pesticides from aqueous solutions. U.S. Pat. No. 3,737,384, also to Sweeney and Fischer, discloses the use of metallic couples, in solutions buffered to near neutral pH for the degradation of pesticides.

More recently, researchers in Japan have reported on the degradation of 1,1,2,2-tetrachloroethane and trichloroethylene in aqueous solution in the presence of iron powder: Senzaki, T. and Y. Kumagai, "Removal of Chlorinated Organic Compounds from Wastewater by Reduction Process: II. Treatment of Trichloroethylene with Iron Powder" Kogyo Yosui, 1989, 369, 19–25. Gillham and O'Hannesin in their article "Metal-Catalyzed Abiotic Degradation of Halogenated Organic Compounds" IAH Conference on Modern Trends in Hydrogeology: Hamilton, Ontario, May 10–13, 1992, have confirmed Senzaki's results. Recently, Gillham received a U.S. Pat. No. 5,266,213, for his method for cleaning halogenated contaminants from groundwater. The process involves feeding contaminated groundwater through a trench containing a metal such as iron, under strict exclusion of oxygen, and over a lengthy period of time.

While the above-mentioned metal systems show the reductive dechlorination of hydrocarbons in aqueous solutions in the presence of iron, they are disadvantaged in that large amounts of iron metal are needed for completion of the reactions, as well as, substantial periods of reaction time are required.

There is a need for an enhanced method for dechlorinating hydrocarbons in contaminated aqueous solutions so as to diminish the amount of metallic iron needed to complete the reaction. There is also a need for a dechlorination method where the rate of the reaction is increased, the amount of metal iron as a reductant is decreased, and innocuous reaction products are generated.

SUMMARY OF THE INVENTION

This invention fulfills these needs by providing a novel method for enhanced remediation of aqueous solutions contaminated with chlorinated hydrocarbons which comprises reacting reductively the chlorinated hydrocarbons with metallic iron in the presence of citric acid thereby generating innocuous byproducts. By combining citric acid with metallic iron in the reaction unexpected results are obtained. A fifteen-fold increase in the rate of dechlorination and about a twelve-fold decrease in the amount of iron needed as a reductant was demonstrated. Also, if the reaction solution is buffered between 5.0 and 7.6, the rate of the reaction is further enhanced.

The process uses iron in the presence of citric acid to detoxify dissolved chlorinated hydrocarbons by removal of the chlorine substituents. The process induces conditions that cause substitution of chlorine atoms by hydrogen atoms. The end products of the process are completely dechlorinated and non-toxic. Examples of end-products for chlorinated hydrocarbons treated by the process are ethene, ethane, methane and chloride ions. Toxic end products or sludge are not produced.

The method of this invention achieves reductive dechlorination of chlorinated hydrocarbons. Iron metal, $Fe^0$, is oxidized to ferrous ion, $Fe^{+2}$, and the chlorinated hydrocarbon is reduced at the chlorine-hydrogen bond. The reaction of iron powder with trichloroethylene in the presence of citric acid results in substantial dechlorination thereby producing reaction products such as ethylene and ethane with small amounts of propane, butane, and pentane. Further, reductive dechlorination of trichloroethylene produces three equivalents of chloride ion for every equivalent trichloroethylene fully dechlorinated.

Citric acid is an important element in the method of this invention. By adding citric acid to the reaction solution, the rate of the dechlorination reaction is substantially increased, while the amount of iron needed to completely dechlorinate the hydrocarbons is reduced.

The invention can be practiced in different settings. For instance, the method of this invention can be practiced in-situ without the removal of the contaminated water from the ground, pond, or stream. Contaminants in groundwater can be degraded in place because the reaction products are environmentally acceptable and need not be removed.

Additionally, this invention may be practiced by batch processing, where the contaminated aqueous solution is treated in a separate container by admixing the reagents with the contaminated solution. The method can be performed in a column packed with iron while the contaminated feed stream contains low levels of citric acid.

An object of this invention is to provide an improved method for dechlorinating hydrocarbons.

It is a further object of our invention to detoxify waters contaminated with halogenated hydrocarbons.

A specific object of our invention is to remove trichloroethylene from contaminated groundwaters.

DESCRIPTION OF THE INVENTION

A system to treat aqueous compositions contaminated with halogenated hydrocarbons that degrades reducible hydrocarbons with metallic iron in the presence of citric acid thereby forming non-toxic products has been discovered. This system increases the rate and efficiency of dehalogenation of hydrocarbons. The essence of this system is the utilization of citric acid as an additive in the reaction mixture.

In the practice of this invention an admixture of elemental iron and citric acid is admixed with chlorinated hydrocarbon-containing aqueous solutions, preferably under buffered conditions. Buffered conditions refers to the utilization of a compatible commercial buffer, such as sodium dibasic phosphate and potassium monobasic phosphate, so as to maintain the pH of the solution between about 5.0 to 7.6. A buffered pH solution between about 5.4 to 6.4 is optimum. However, the reaction will proceed without a buffering agent in the pH range of about 3.0 to 9.0.

For example, when using sodium dibasic phosphate and potassium monobasic phosphate to buffer the reaction, a solution pH of 5.1 requires about 1.8% by weight sodium dibasic phosphate and 98.2% by weight potassium monobasic phosphate. For a solution pH of 5.8, about 9% by weight sodium dibasic phosphate and 91% by weight potassium monobasic phosphate is needed. A solution pH of 6.0 requires about 13% by weight sodium dibasic phosphate and the balance 87% by weight potassium monobasic phosphate.

The iron metal can be in any form, such as powder, filings, shavings, sheet, or chips. An effective amount of elemental iron to degrade the chlorinated hydrocarbons is added to the solution. By an effective amount is meant an amount of iron required to achieve reaction half-lives of less than ten minutes. Reaction half-life refers to the amount of time at which half of the initial concentration of the chlorinated hydrocarbons is dechlorinated. For example, to obtain a half-life of 8 minutes for an initial concentration of 25 parts per million trichloroethylene in 100 milliliters of aqueous sample, 2.0 grams of iron is an effective amount.

An effective amount of citric acid is added to the reaction mixture. The term effective amount, as used herein, means an amount which is sufficient to materially substantially increase the rate of iron-induced dehalogenation of halogenated hydrocarbon compounds, such as trichloroethylene, and the like. The amount of citric acid added is about 0.5 to 1.0 per cent by weight of the amount of iron used in the reaction. For instance, in a reaction utilizing two grams of iron, 0.01 to 0.02 grams of citric acid are used to achieve reaction half-lives of less than ten minutes.

The dehalogenation reaction is normally carried out under ambient temperature and pressure. Temperatures as low as about 17° C. can be utilized, as well as temperatures above 25° C. When temperatures above 25° C. are employed, the result is a faster rate of reaction.

Low amounts of iron, about two grams, and possibly as low as 0.75 grams, can be employed to dechlorinate twenty-five parts per million trichloroethylene, so as to achieve half-lives of less than eight minutes when as little as half a percent of citric acid based upon the weight of iron is present.

Comparison of the results of an unbuffered reaction solution without citric acid to an unbuffered reaction using two grams of iron and 0.02 grams of citric acid are shown in Table 1. The half-life of the reaction without citric acid is 48 hours. Comparatively, the half-life of the reaction with 1% citric acid by weight of iron is about 1 hour.

TABLE 1

Dechlorination of Trichloroethylene, TCE, (~22 ppm) with Electrolytic Iron with and without 1% Citric Acid Based on Weight of Iron

| | 25 g Iron, no citric acid | | 2 g Iron with 0.02 g citric acid | |
|---|---|---|---|---|
| | Time (hour) | TCE LOSS (ppm) | TIME (hour) | TCE LOSS (ppm) |
| 1 | 0.0000 | 21.930 | 0.0000 | 20.560 |
| 2 | 4.0000 | 21.230 | 0.2500 | 17.940 |
| 3 | 8.0000 | 20.890 | 0.5000 | 17.130 |
| 4 | 24.000 | 16.350 | 0.7500 | 15.890 |
| 5 | 28.000 | 15.180 | 1.0000 | 14.010 |
| 6 | 32.000 | 14.120 | 2.0000 | 11.240 |
| 7 | 48.000 | 12.870 | 3.0000 | 9.0010 |
| 8 | 72.000 | 7.8760 | 4.0000 | 3.1060 |
| 9 | | | 5.0000 | 2.6220 |
| 10 | | | 23.0000 | 2.3070 |

If one buffers the reaction to control the pH using either commercial sodium dibasic phosphate and potassium monobasic phosphate buffers or calcium carbonate and carbon dioxide, the reaction rate with citric acid is enhanced further. For instance, in a buffered solution at pH 5.8, the corresponding half-life of the dechlorination of 24 parts per million trichloroethylene is calculated to be about eight minutes with 1% by weight citric acid based on the amount of iron and 1.76 grams of iron. In a buffered solution, pH 5.8, without citric acid, the half-life is about forty-nine minutes. Table 2 gives the calculations for sodium dibasic phosphate and potassium monobasic phosphate buffered solutions at pH of 5.8 with 1.76 grams of iron with and without citric acid.

TABLE 2

Dechlorination of TCE (~19 ppm) with Electrolytic Iron (1.76 g) with and without Citric Acid in Na/K Phosphate Buffered Solutions at pH 5.8.

| | | No Citric Acid TCE | 0.018 g Citric Acid TCE |
|---|---|---|---|
| | Time (hour) | LOSS (ppm) | LOSS (ppm) |
| 1 | 0.0000 | 19.130 | 19.130 |
| 2 | 0.2500 | 14.040 | 6.3160 |
| 3 | 0.5000 | 12.490 | 2.5310 |
| 4 | 0.7500 | 11.060 | 1.1810 |
| 5 | 1.0000 | 9.281 | 0.17300 |
| 6 | 2.0000 | 4.8430 | 0.0000 |
| 7 | 3.0000 | 3.1820 | 0.0000 |
| 8 | 4.0000 | 3.4320 | 0.0000 |

Table 3 gives the calculations for sodium dibasic phosphate and potassium monobasic phosphate buffered solutions at a pH of 6.0 with 1.76 grams of iron with and without citric acid. The half-life for the buffered reaction without citric acid is greater than fifty-four minutes. The half-life of the buffered reaction with about 0.018 grams of citric acid is less than fifteen minutes.

TABLE 3

Dechlorination of TCE (~19 ppm) with
Electrolytic Iron (1.76 g) with and without
Citric Acid in Na/K Phosphate Buffered Solutions
at pH 6.0.

|   | Time (hour) | No Citric Acid TCE LOSS (ppm) | 0.018 g Citric Acid TCE LOSS (ppm) |
|---|---|---|---|
| 1 | 0.0000 | 19.130 | 19.130 |
| 2 | 0.2500 | 12.840 | 5.4090 |
| 3 | 0.5000 | 11.660 | 3.6270 |
| 4 | 0.7500 | 10.250 | 0.9570 |
| 5 | 1.0000 | 8.3790 | 0.2430 |
| 6 | 2.0000 | 6.1520 | 0.0000 |
| 7 | 3.0000 | 2.8420 | 0.0000 |
| 8 | 4.0000 | 2.2070 | 0.0000 |

Table 4 gives the calculations for sodium dibasic phosphate and potassium monobasic phosphate buffered solutions a pH of 5.6 with 1.76 grams of iron with and without citric acid. The half-life for the buffered reaction without citric acid is greater than forty-five minutes. The half-life of the buffered reaction with about 0.018 grams of citric acid is less than fifteen minutes.

TABLE 4

Dechlorination of TCE (~21 ppm) with
Electolytic Iron (1.76 g) with and without
Citric Acid in Na/K Phosphate Buffered Solutions
at pH 5.6.

|   | Time (hour) | No Citric Acid TCE LOSS (ppm) | 0.018 g Citric Acid TCE LOSS (ppm) |
|---|---|---|---|
| 1 | 0.0000 | 21.000 | 21.000 |
| 2 | 0.2500 | 15.000 | 2.000 |
| 3 | 0.5000 | 13.000 | 0.000 |
| 4 | 0.7500 | 10.000 | 0.000 |
| 5 | 1.0000 | 9.000 | 0.000 |
| 6 | 1.5000 | 6.000 | 0.000 |
| 7 | 2.0000 | 5.000 | 0.000 |
| 8 | 3.0000 | 2.000 | 0.000 |

The following example serves to demonstrate further the method of this invention.

EXAMPLE I

General Procedures: Electrolytic iron was used as purchased. Citric acid and trichloroethylene were used as received. Gas chromatography conditions include use of an electron capture detector operating at 300° C. and injector temperature of 200° C. A capillary JW Scientific DB-1 column (30 meters) was used with a temperature gradient program set at an initial oven temperature of 50° C. and held for 2 minutes after which time the temperature was ramped to 120° C. at a rate of 20° C. per minute and held for 5 minutes. Reactions were set in 100 mL hypovials and loaded with iron, buffers, or citric acid prior to the addition of a 20-25 ppm trichloroethylene aqueous solution.

Dechlorination Experiments: In a typical reaction 2.0 grams of iron (0.036 moles) are added to a 100 mL hypovial. Citric acid in the amount of 0.02 grams (0.01 mmoles) is added to the same vial with 1.0 gram of commercially available sodium phosphate dibasic and potassium phosphate monobasic to control the pH at 5.8 for 100 mL of aqueous solution. 100 mL of a 25 ppm trichloroethylene aqueous solution are added to the vial and the vial is immediately sealed with teflon coated septa and aluminum crimp caps. The hypovials containing all the reagents are shaken through use of an Orbital Shaker set at 200 rpm. To ensure integrity of the trichloroethylene aqueous solutions, sampling is performed using a five mL gas tight syringe and the sample is withdrawn and immersed in an equivolume amount of high purity hexane to extract trichloroethylene from the aqueous phase prior to electron capture detection analysis. Complete loss of trichloroethylene from the aqueous solution is seen within three hours coupled with chloride ion production. The chloride ion generated accounts for 80–95% of the chloride ion generated upon dechlorination, with the remainder of the chloride present in iron as akagenite, an iron oxide that occludes chloride ion within its structure.

We claim:

1. A method for dehalogenation of aqueous compositions contaminated with halogenated hydrocarbon compounds consisting essentially of admixing the aqueous compositions with an amount of metallic iron effective to dehalogenate the halogenated hydrocarbons in the presence of citric acid in an amount of from about 0.5 to 1.0 percent by weight of the amount of iron in the reaction, said reaction occurring at a pH of from about 5.0 to 9.0 and at a temperature of at least about 17° C.

2. A method according to claim 1 wherein the halogenated hydrocarbon compounds are chlorinated hydrocarbons.

3. A method according to claim 2 wherein the chlorinated hydrocarbons are polychlorinated hydrocarbons.

4. A method according to claim 3 wherein the polychlorinated hydrocarbon is trichloroethylene.

5. A method according to claim 1 wherein the reaction is buffered and the pH is between about 5.0 and about 7.6.

6. A method according to claim 5 wherein the pH is between about 5.4 and 6.4.

7. A method according to claim 5 wherein the buffering agent is sodium dibasic phosphate and potassium monobasic phosphate.

8. A method according to claim 1 wherein the contaminated aqueous solution is groundwater.

9. A method according to claim 8 wherein the reaction takes place in-situ.

10. A method for dechlorinating trichloroethylene in an aqueous solution consisting essentially of admixing an amount of iron metal effective to dechlorinate said trichlorethylene and citric acid in an amount of from about 0.5 to 1.0 percent by weight of the amount of in the reaction in the solution at a pH between about 5.4 and 6.4 and at a temperature of at least about 17° C.

* * * * *